Patented Oct. 8, 1929

1,730,609

UNITED STATES PATENT OFFICE

MORRIS GROSSMAN, OF NEW YORK, N. Y.

PROCESS OF MANUFACTURING SYNTHETIC MINERAL FIBERS

No Drawing.     Application filed October 17, 1927.    Serial No. 226,822.

The object of my invention is to produce a synthetic mineral fiber, as the result of reactions brought about by means of reagents of relatively low cost and yielding a product available by reason of its properties for a large number of useful purposes.

The process is as follows: It is first necessary to fuse powdered quartz or silica as sand, with caustic soda or with sodium carbonate or sodium sulphate. To this there is added a small amount of charcoal to assist in the complete reduction of the carbonate, provided the carbonate is employed. The fusion is done in a reverberatory furnace and requires eight to ten hours. The resulting silicate is transparent or translucent, slightly green from traces of iron. It is thereupon powdered and boiled in water, this step being done in a digester under pressure until the soluble matter is dissoved. After ten hours of boiling the solution is drawn from the boiler and filtered upon cloth, and permitted to settle. It is then concentrated to 140 deg., Tw. (1.7 sp. gr.)

There is another method of preparing the aforementioned product and that is by boiling silica (preferably infusorial earth) in a digester with a solution of caustic soda of specific gravity 1.22–1.24 (not higher) under 3 or 4 atmospheres pressure for three hours. The completed solution is effected when a sample withdrawn has no more than a faint alkaline reaction. The clarified liquid is drawn off and concentrated to a specific gravity of 1.7, in iron pans; 2.8 parts of infusorial earth are used to one part of caustic soda.

The silicate thus formed is now filtered very carefully and freed of air bubbles by vacuum, thereupon it is transferred under pressure to the spinning machines. The silicate is pumped through mechanical regulators which are placed upon the spinning machines; each regulator pumping a constant amount of silicate to the outlets, which are fitted with suitable nozzles. The silicate being forced through the minute holes of the nozzles is divided into a very fine stream of liquid and the streams are then permitted to pass through a hardening bath containing a solution of calcium chloride. The sodium silicate filament in passing through the calcium chloride solution, forms a double silicate, i. e. sodium calcium silicate, part of the sodium of the silicate combining with the chloride of calcium to form sodium chloride. The filament is now picked up and washed so as to free it of the sodium chloride. The filament which I now term "silicose" is passed into a drying chamber of 75 deg. C. where the action of the heat in the chamber absorbs the moisture and water content of the filament and definitely coagulates and hardens the filament into fine fibers of silicate. The size of the spun thread is determined by the amount of solution of known silica content projected through the nozzles in unit time and by the rate of speed at which the filament is collected. Besides hardening to a very strong bond, this silicate fiber has high heat resistance. It is not affected by ordinary temperatures nor is it affected by oils, fats or greases of any kind and in addition has also valuable acid resistant properties.

In carrying out my process, I may employ silica or silicic acid either alone or in chemical combination with potash, soda, calcium, barium, magnesium, iron, strontium, lithium, lead oxide, zinc oxide, bismuth oxide, thallium oxide or a combination of these with silica and boric acid or boric acid where it replaces silicic acid.

I may use any of the natural silicates, for example, basalts, trachytes, granites, felspars, micas, lavas, or pumices.

In carrying out one form of my process I may employ a hardening bath containing a solution of magnesium sulphate or other magnesium salt or hydroxide or zinc chloride or other zinc salt or aluminum salt or iron salt alone or in combination with one another or a calcium salt.

The product of this process is adapted to replace asbestos in the industrial arts.

I have substantially described my process naming chemicals as preferably used by me, but changes in proportion under varying conditions may be used and substantially equivalent elements be employed as I do not confine myself to either as long as the spirit of my invention is employed.

What I claim is:

1. The process of producing a synthetic mineral fiber consisting in boiling sodium silicate with a solution of caustic soda under pressure for several hours, concentrating the liquid, spinning the sodium silicate into fiber, and thereafter passing the fiber through a hardening bath containing a solution of calcium chloride.

2. The process of producing a synthetic mineral fiber consisting in boiling sodium silicate with a solution of caustic soda under pressure for several hours, concentrating the liquid, spinning the sodium silicate into fiber, and thereafter passing the fiber through a hardening bath containing a solution of a calcium salt.

3. The process of producing a synthetic mineral fiber consisting in subjecting a silicate to heat and pressure, spinning the silicate into fiber, and thereafter subjecting the fiber to the action of a hardening bath.

4. The process of producing a synthetic mineral fiber consisting in fusing silica with caustic acid or sodium sulphate for a period of from eight to ten hours in a reverberatory furnace, powdering the product; boiling it in water under pressure until the soluble matter is dissolved, filtering the solution upon a cloth, and concentrating it to a specific gravity of 1.7, and forming it into fiber.

5. The process of producing a synthetic mineral fiber consisting in powdering sodium silicate, boiling it in water under pressure until the soluble matter is dissolved, drawing off the solution and filtering it, permitting it to settle and concentrating it to approximately 140 deg. Tw. and forming it into fiber.

6. The process of producing a synthetic mineral fiber consisting in filtering a solution of sodium silicate, spinning it into fiber, passing the fiber through a hardening bath, thereafter washing the fiber, and drying it to harden the fibers.

7. The process of producing a synthetic mineral fiber consisting in boiling sodium silicate with a solution of caustic soda under pressure for several hours, concentrating the liquid, spinning the sodium silicate into fiber, and thereafter passing the fiber through a hardening bath containing a solution of calcium hydroxide.

MORRIS GROSSMAN.